US 11,277,036 B2

(12) United States Patent
Morioka et al.

(10) Patent No.: US 11,277,036 B2
(45) Date of Patent: Mar. 15, 2022

(54) RECTENNA CONTROLLER AND RECTENNA APPARATUS INCLUDING THE SAME

(71) Applicant: Mitsubishi Electric Corporation, Tokyo (JP)

(72) Inventors: Takayuki Morioka, Tokyo (JP); Yasutoshi Yashiki, Tokyo (JP); Hidetada Tokioka, Tokyo (JP); Toshiyuki Tanaka, Tokyo (JP); Yukihiro Homma, Tokyo (JP); Maho Utsumi, Tokyo (JP); Masaomi Tsuru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/734,231

(22) PCT Filed: Feb. 27, 2019

(86) PCT No.: PCT/JP2019/007651
§ 371 (c)(1),
(2) Date: Dec. 2, 2020

(87) PCT Pub. No.: WO2020/017084
PCT Pub. Date: Jan. 23, 2020

(65) Prior Publication Data
US 2021/0218285 A1 Jul. 15, 2021

(30) Foreign Application Priority Data

Jul. 18, 2018 (JP) .............................. JP2018-134963

(51) Int. Cl.
*H02J 17/00* (2006.01)
*H02J 50/27* (2016.01)
(Continued)

(52) U.S. Cl.
CPC ............... *H02J 50/27* (2016.02); *H02H 9/04* (2013.01); *H02M 3/155* (2013.01)

(58) Field of Classification Search
CPC ................................ H02M 3/155; H02J 50/27
See application file for complete search history.

(56) References Cited

U.S. PATENT DOCUMENTS

| 9,935,687 B2* | 4/2018 | McManus | ............ H04B 5/0075 |
| 2012/0133216 A1* | 5/2012 | Amma | .................... H02J 50/10 307/104 |

(Continued)

FOREIGN PATENT DOCUMENTS

| JP | 2015-89239 A | 5/2015 |
| JP | 2016-116325 A | 6/2016 |

OTHER PUBLICATIONS

International Search Report and Written Opinion dated Apr. 23, 2019, received for PCT Application No. PCT/JP2019/007651, filed on Feb. 27, 2019, 6 pages including English Translation.

*Primary Examiner* — Jared Fureman
*Assistant Examiner* — Esayas G Yeshaw
(74) *Attorney, Agent, or Firm* — Xsensus LLP

(57) ABSTRACT

A rectenna controller connected to a rectenna that receives radio frequency power and converts the radio frequency power into direct current power, the rectenna controller controlling the direct current power received from the rectenna and supplying the controlled direct current power to a load, the rectenna controller including: an input terminal receiving the direct current power converted by the rectenna; an output terminal supplying the controlled direct current power to the load; a first switching element disposed in a current path connecting the input terminal to the output terminal; and a controller controlling the first switching element, wherein when the controller does not operate, the (Continued)

first switching element becomes conducting to render the current path conductive.

9 Claims, 6 Drawing Sheets

(51) Int. Cl.
*H02H 9/04* (2006.01)
*H02M 3/155* (2006.01)

(56) References Cited

U.S. PATENT DOCUMENTS

| | | | |
|---|---|---|---|
| 2012/0268090 A1* | 10/2012 | Sasaki | H02M 3/158 |
| | | | 323/271 |
| 2015/0372541 A1* | 12/2015 | Guo | H02J 50/27 |
| | | | 307/104 |
| 2016/0132766 A1* | 5/2016 | Adams | G06N 3/063 |
| | | | 706/33 |
| 2018/0301945 A1* | 10/2018 | Ishida | H03C 1/62 |
| 2018/0358900 A1* | 12/2018 | Sun | H02M 3/1582 |
| 2019/0214912 A1* | 7/2019 | Hong | H02M 3/158 |
| 2019/0288609 A1* | 9/2019 | Tsuru | H02M 7/08 |
| 2021/0050819 A1* | 2/2021 | Wang | H03F 1/0227 |

\* cited by examiner

F I G. 3
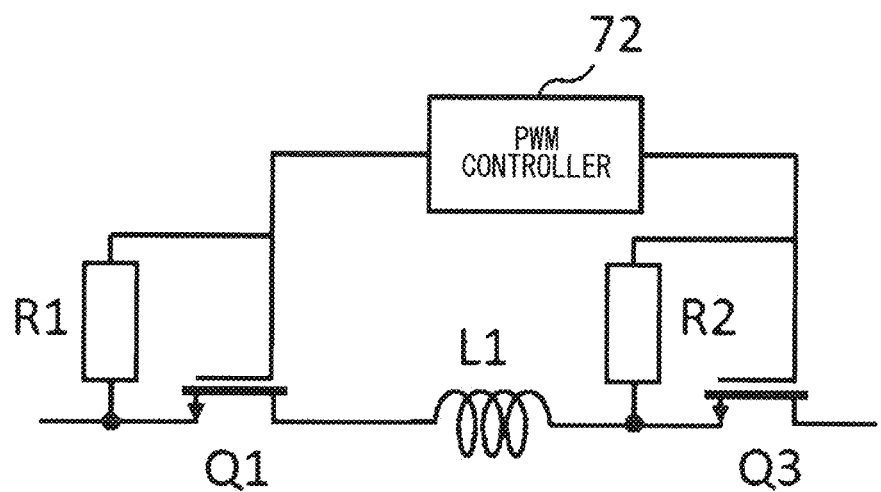

F I G. 6
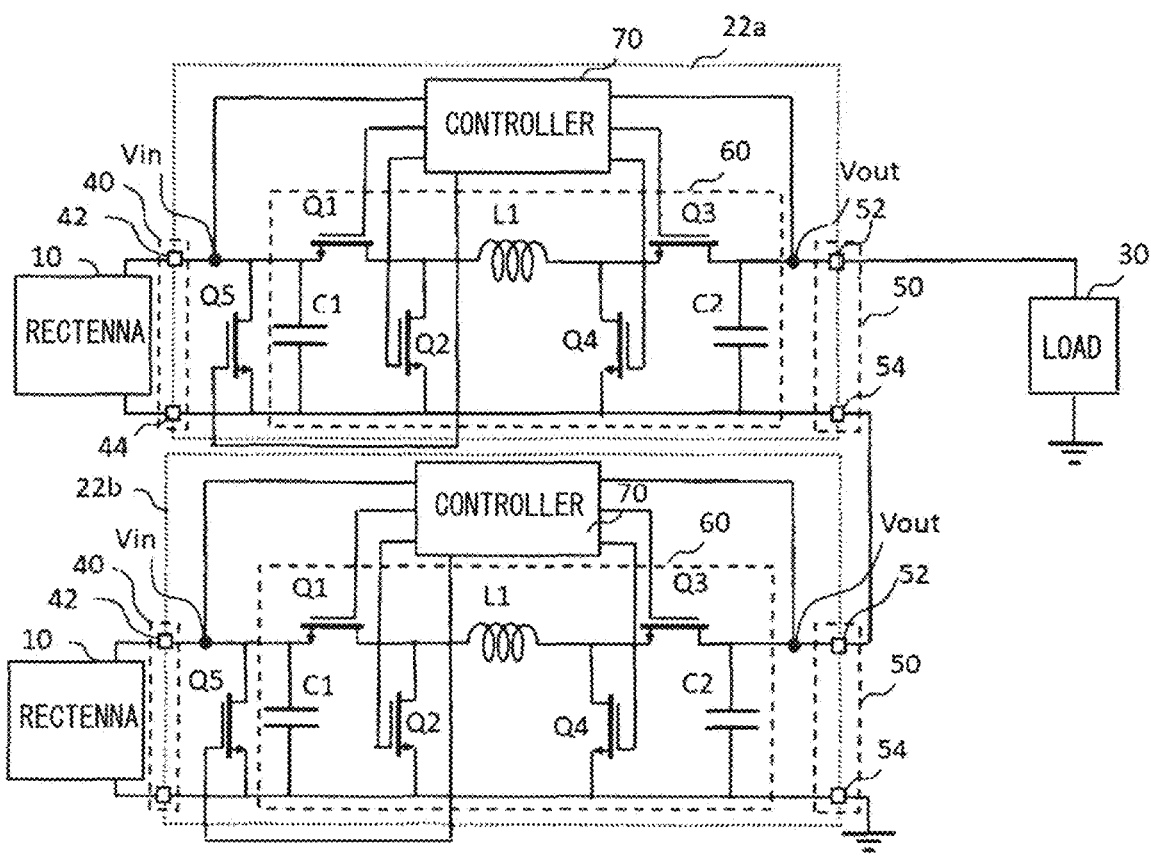

RECTENNA CONTROLLER AND RECTENNA APPARATUS INCLUDING THE SAME

CROSS-REFERENCE TO RELATED APPLICATIONS

The present application is based on PCT filing PCT/JP2019/007651, filed Feb. 27, 2019, which claims priority to JP 2018-134963, filed Jul. 18, 2018, the entire contents of each are incorporated herein by reference.

TECHNICAL FIELD

The present invention relates to a rectenna controller and a rectenna apparatus including the same.

BACKGROUND ART

As power receivers of future wireless power-transfer systems and space-based solar power systems, the use of rectenna apparatuses each including a rectifying antenna (rectenna) that receives radio frequency power such as microwaves and converts the radio frequency power into direct current power has been studied.

Each of the rectenna apparatuses receives radio frequency power such as microwaves and converts the radio frequency power into direct current power through the rectenna, for example, to supply a load such as a storage battery or a power machine with the power generated by the rectenna. Depending on the magnitude of a resistance value of the load such as the storage battery or the power machine, a power conversion efficiency (an RF-DC conversion efficiency) from the radio frequency to the direct current in the rectenna apparatus varies. Thus, the rectenna apparatus includes, for example, a rectenna controller such as a DC-DC converter which is disposed between the rectenna and the load and controls an output voltage of the rectenna to maintain a high power conversion efficiency regardless of the resistance value of the load (see Patent Document 1).

Moreover, a rectenna apparatus including an overvoltage protection circuit such as a Zener diode exists. The overvoltage protection circuit is disposed between a rectenna and a rectenna controller, and protects the rectenna against an excessive voltage (see Patent Document 2).

PRIOR ART DOCUMENT

Patent Document

[Patent Document 1] Japanese Patent Application Laid-Open No. 2016-116325
[Patent Document 2] Japanese Patent Application Laid-Open No. 2015-89239

SUMMARY

Problem to be Solved by the Invention

However, for example, when a rectenna does not generate power in such a conventional rectenna apparatus, a rectenna controller is in an OFF state, and a state between the rectenna and a load is open. Thus, when the rectenna does not generate power and the rectenna receives high power such as microwaves, the voltage to be applied to the rectenna abruptly rises and exceeds the breakdown voltage of the rectenna. This creates a problem in that the rectenna becomes faulty because the state between the rectenna and the load is open before the rectenna controller starts.

The conventional rectenna apparatus including the overvoltage protection circuit, such as a Zener diode, between the rectenna and the rectenna controller can limit the DC voltage received and converted by the rectenna. However, an RF voltage which abruptly rises and has an amplitude approximately double that of the DC voltage is applied to the rectenna. This hastens the deterioration of the rectenna, and creates a problem in that the rectenna becomes faulty.

Thus, the present invention has been conceived to solve the problems of such conventional technologies, and has an object of providing a rectenna controller and a rectenna apparatus including the same which can prevent an abrupt rise in a voltage to be applied to a rectenna and a fault in the rectenna.

Means to Solve the Problem

To achieve the object, a rectenna controller according to the present invention is connected to a rectenna that receives radio frequency power and converts the radio frequency power into direct current power, the rectenna controller controlling the direct current power received from the rectenna and supplying the controlled direct current power to a load, the rectenna controller including: an input terminal receiving the direct current power converted by the rectenna; an output terminal supplying the controlled direct current power to the load; a first switching element disposed in a current path connecting the input terminal to the output terminal; and a controller controlling the first switching element, wherein when the controller does not operate, the first switching element becomes conducting to render the current path conductive.

Effects of the Invention

In the rectenna controller and the rectenna apparatus including the same according to the present invention with the aforementioned configuration, when the controller does not operate, the first switching element becomes conducting to render the current path conductive. Thus, the rectenna controller and the rectenna apparatus including the same can prevent an abrupt rise in a voltage to be applied to the rectenna, and prevent a fault in the rectenna.

BRIEF DESCRIPTION OF DRAWINGS

FIG. 3 is a circuit diagram illustrating a configuration of a part of the rectenna apparatus according to Embodiment 1 of the present invention.

FIG. 6 is a circuit diagram illustrating another configuration of the rectenna apparatus according to Embodiment 3 of the present invention.

DESCRIPTION OF EMBODIMENTS

Figure 1:
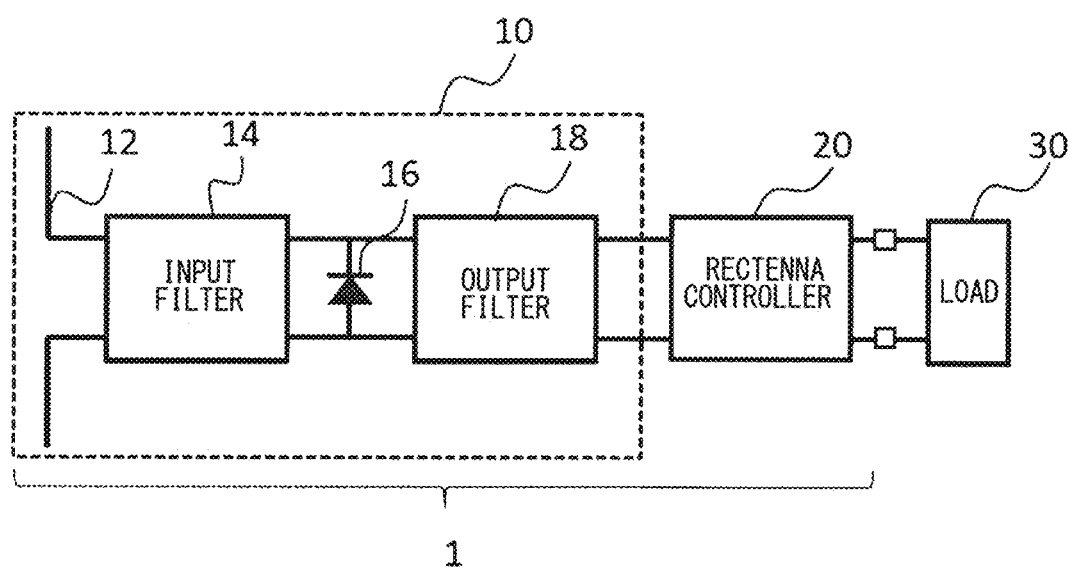
FIG. 1 is a block diagram illustrating a configuration of a rectenna apparatus according to Embodiment 1 of the present invention.

First, a configuration of a rectenna controller and a rectenna apparatus including the same according to this invention will be described with reference to the drawings. The drawings are schematic, and conceptually illustrate functions or structures. Furthermore, Embodiments to be described below do not restrict the present invention. Unless specified, the basic configuration of the rectenna controller and the rectenna apparatus including the same is common in all Embodiments. Constituent elements indicated by the same reference numeral are identical or equivalent constituent elements, which is common in the entire Description.

Although each of Embodiments of the present invention describes the radio frequency power received by a rectenna as microwaves, the radio frequency power is not necessarily limited to these.

Embodiment 1

FIG. 1 is a block diagram illustrating a configuration of a rectenna apparatus according to Embodiment 1 of the present invention.

As illustrated in FIG. 1, a rectenna apparatus 1 according to Embodiment 1 includes a rectenna 10 and a rectenna controller 20. The rectenna controller 20 is connected to, for example, a load 30 such as a storage battery, a power machine, or an electric power system. The rectenna apparatus 1 consists of a one- or two-dimensional array of units each including the rectenna 10 and the rectenna controller 20.

The rectenna 10 is, for example, a device that receives microwaves and converts the microwaves into direct current power. As illustrated in FIG. 1, the rectenna 10 includes a receiving antenna 12, an input filter 14, a rectifier 16, and an output filter 18.

The receiving antenna 12 such as a dipole antenna or a microstrip antenna, for example, receives microwaves.

Although the frequencies of the microwaves received from the receiving antenna 12 are, for example, in the 2.4 to 2.5 GHz band or in the 5.8 GHz band, the frequencies are not limited to these but may be, for example, in the 800 MHz to 2 GHz band or in the 3 GHz to 30 GHz band.

As illustrated in FIG. 1, the input filter 14 is connected to the receiving antenna 12, and is a filter transparent to the microwaves received from the receiving antenna 12. The input filter 14 prevents, from being output toward the receiving antenna 12, a harmonic component of the microwaves which is generated when the rectifier 16 rectifies the microwaves. The input filter 14 is, for example, a bandpass filter or a lowpass filter for blocking the harmonic component of these microwaves.

The rectifier 16 is, for example, a rectifier diode, and rectifies the microwaves received from the receiving antenna 12 and converts the microwaves into direct current power. As illustrated in FIG. 1, the rectifier 16 is connected between the input filter 14 and the output filter 18.

The output filter 18 is a filter transparent to the direct current power rectified and converted by the rectifier 16. The output filter 18 prevents, from being output toward the rectenna controller 20, the harmonic component of the microwaves which is generated when the rectifier 16 rectifies the microwaves. As illustrated in FIG. 1, the output filter 18 is connected to an output of the rectifier 16. The output filter 18 is, for example, a bandpass filter or a lowpass filter for blocking the harmonic component of these microwaves. Here, the output filter 18 may be a filter for blocking, simultaneously with the harmonic component, the residual component of the microwaves that is not rectified by the rectifier 16.

The rectenna controller 20 controls the output voltage of the rectifier 16 by adjusting the impedance between the rectenna 10 and the load 30 so that the power conversion efficiency (RF-DC conversion efficiency) when the rectifier 16 converts the microwaves into the direct current power is maximized. As illustrated in FIG. 1, the rectenna controller 20 is connected between the output filter 18 and the load 30.

The rectenna apparatus 1 according to Embodiment 1 receives microwaves through the receiving antenna 12, and rectifies the microwaves received from the receiving antenna 12 and converts the microwaves into direct current power using the rectifier 16. Then, the rectenna apparatus 1 controls, using the rectenna controller 20, the output voltage of the rectifier 16 by adjusting the impedance between the rectenna 10 and the load 30 so that the power conversion efficiency of the direct current power resulting from the conversion is maximized. For example, the rectenna apparatus 1 supplies the direct current power with a voltage appropriate for the load 30 such as a storage battery, a power machine, or an electric power system.

Figure 2:
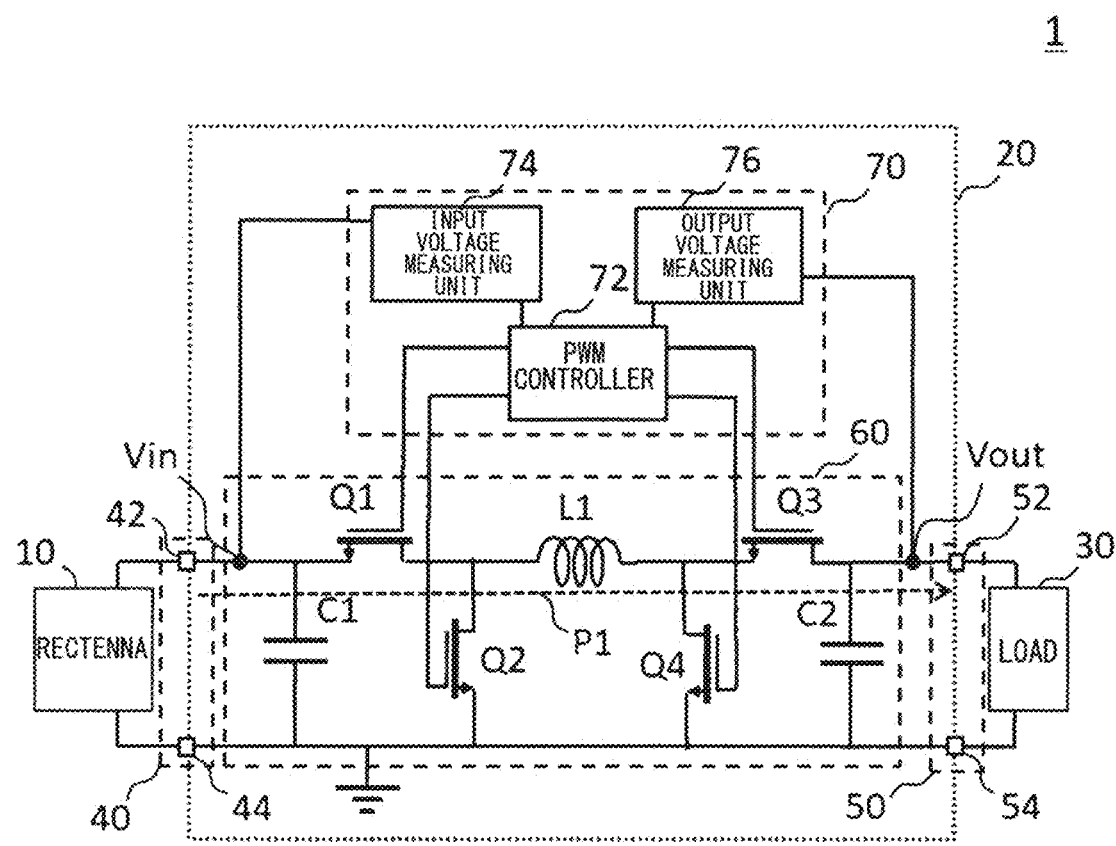
FIG. 2 is a circuit diagram illustrating a detailed configuration of the rectenna apparatus according to Embodiment 1 of the present invention.

Next, a configuration of the rectenna controller 20 according to Embodiment 1 will be described in detail. FIG. 2 is a circuit diagram illustrating a detailed configuration of the rectenna apparatus 1 according to Embodiment 1, and particularly illustrates a circuit configuration in the rectenna controller 20 in detail.

As illustrated in FIG. 2, the rectenna controller 20 according to Embodiment 1 includes: an input unit 40 connected to the rectenna 10; an output unit 50 connected to the load 30; a voltage controller 60 connected between the input unit 40 and the output unit 50; and a controller 70 that controls the voltage controller 60.

As illustrated in FIG. 2, the input unit 40 includes an input terminal 42 and an input ground terminal 44 that is grounded. The input unit 40 receives an input voltage Vin converted into the direct current power by the rectenna 10.

As illustrated in FIG. 2, the output unit 50 includes an output terminal 52 and an output ground terminal 54 that is grounded. The output unit 50 supplies, as an output voltage, the load 30 with the input voltage controlled by the voltage controller 60 so that the power conversion efficiency of the direct current power converted by the rectenna 10 is maximized.

As illustrated in FIG. 2, the voltage controller 60, for example, a DC-DC converter is disposed between the input unit 40 and the output unit 50. The voltage controller 60 controls the input voltage of the rectenna 10 through the control of the controller 70 by adjusting the impedance between the rectenna 10 and the load 30 so that the power conversion efficiency of the direct current power resulting from the conversion is maximized.

As illustrated in FIG. 2, the voltage controller 60 includes capacitors C1 and C2, switching elements Q1 to Q4, and an inductor L1. The capacitor C1 is connected between the input terminal 42 and the input ground terminal 44. The capacitor C2 is connected between the output terminal 52 and the output ground terminal 54. The switching element Q1 has one end that is connected to the input terminal 42 and one end of the capacitor C1. The switching element Q2 has one end that is connected to another end of the switching element Q1, and another end that is grounded. The switching element Q2 is connected in parallel with the capacitor C1. The switching element Q3 has one end that is connected to the output terminal 52 and one end of the capacitor C2. The switching element Q4 has one end that is connected to another end of the switching element Q3, and another end that is grounded. The switching element Q4 is connected in parallel with the capacitor C2. The control terminals of the switching elements Q1 to Q4 are connected to the controller 70. The inductor L1 has one end that is connected to another end of the switching element Q1 and one end of the switching element Q2, and another end that is connected to another end of the switching element Q3 and one end of the switching element Q4.

As illustrated in FIG. 2, the controller 70 includes a pulse width modulation (PWM) controller 72, an input voltage measuring unit 74, and an output voltage measuring unit 76.

As illustrated in FIG. 2, the PWM controller 72 is connected to the control terminals of the switching elements Q1 to Q4. Since the PWM controller 72 controls the input voltage of the rectenna 10 by adjusting the impedance between the rectenna 10 and the load 30 so that the power conversion efficiency of the direct current power resulting from the conversion is maximized, it supplies a control signal to each of the control terminals of the switching elements Q1 to Q4 to control ON/OFF of the switching elements Q1 to Q4.

As illustrated in FIG. 2, the input voltage measuring unit 74 measures the input voltage Vin of the input terminal 42 of the input unit 40, and transmits a measured input voltage value to the PWM controller 72. As illustrated in FIG. 2, the output voltage measuring unit 76 measures an output voltage Vout of the output terminal 52 of the output unit 50, and transmits a measured output voltage value to the PWM controller 72.

The PWM controller 72 performs feedback control on a duty cycle of each of the control signals of the switching elements Q1 to Q4, based on the input voltage Vin measured by the input voltage measuring unit 74 and the output voltage Vout measured by the output voltage measuring unit 76 so that the power conversion efficiency of the direct current power resulting from the conversion is maximized and the rectifier 16 of the rectenna 10 does not yield to control ON/OFF of the switching elements Q1 to Q4.

The PWM controller 72, the input voltage measuring unit 74, and the output voltage measuring unit 76 in the controller 70 operate at a driving voltage supplied through a constant voltage regulator that is not illustrated, based on the input voltage Vin received from the rectenna 10.

Here, when the controller 70 operates based on the input voltage Vin from the rectenna 10, the switching elements Q2 and Q4 are preferably normally-off switching elements, for example, p- or n-type enhancement-mode MOSFETs.

The switching elements Q1 and Q3 of the rectenna controller 20 according to Embodiment 1 are disposed in a current path P1 connecting the input terminal 42 of the input unit 40 to the output terminal 52 of the output unit 50. When the controller 70 does not operate, the switching elements Q1 and Q3 become conducting to render the current path P1 conductive. Specifically, the switching elements Q1 and Q3 can be, for example, depletion-mode MOSFETs or normally-on transistors such as GaN-HEMTs. Furthermore, the switching elements Q1 and Q3 can be enhancement-mode p-type MOSFETs. Disposing a pull-down resistor between a gate and a ground potential of each of the enhancement-mode p-type MOSFETs renders a source and a drain of the p-type MOSFET conductive when the input voltage from the rectenna 10 exceeds a threshold voltage between the gate and the source of the p-type MOSFET. Thus, when the controller 70 does not operate, the switching elements Q1 and Q3 can be conducting. Furthermore, the switching elements Q1 and Q3 are switching elements that become conducting to render the current path P1 conductive when the controller 70 does not operate, that is, when the controller 70 does not output any control signal to the switching elements Q1 to Q4. Here, the normally-on transistors are, for example, transistors that render a source and a drain conductive when the gate-source voltage is 0 V.

The rectenna controller 20 according to Embodiment 1 is configured as described above.

Next, operations of the rectenna controller 20 according to Embodiment 1 will be described.

In normal operations, the rectenna apparatus 1 receives microwaves through the receiving antenna 12, and rectifies the microwaves received from the receiving antenna 12 and converts the microwaves into direct current power using the rectifier 16 as described above. Then, the rectenna apparatus 1 controls, using the rectenna controller 20, the output voltage of the rectifier 16 by adjusting the impedance between the rectenna 10 and the load 30 so that the power conversion efficiency of the direct current power resulting from the conversion is maximized. For example, the rectenna apparatus 1 supplies the direct current power with a voltage appropriate for the load 30 such as a storage battery, a power machine, or an electric power system.

Here, the rectenna controller 20 controls ON/OFF of the switching elements Q1 to Q4 so that the power conversion efficiency of the direct current power resulting from the conversion is maximized. The PWM controller 72 controls ON/OFF of the switching elements Q1 to Q4. The PWM controller 72 performs feedback control on a duty cycle of each of the control signals of the switching elements Q1 to Q4, based on the input voltage Vin measured by the input voltage measuring unit 74 and corresponding to the direct current power received from the rectenna 10 and the output voltage Vout measured by the output voltage measuring unit 76 and output from the voltage controller 60 so that the power conversion efficiency of the direct current power is maximized to control ON/OFF of the switching elements Q1 to Q4.

Specifically, in the rectenna controller 20 according to Embodiment 1, the switching elements Q1 and Q2, and the switching elements Q3 and Q4 have a structure for synchronous rectification. The PWM controller 72 synchronizes the switching elements Q1 and Q2, and the switching elements Q3 and Q4 to control the duty cycles so that the switching element Q2 is OFF when the switching element Q1 is ON and the switching element Q4 is OFF when the switching element Q3 is ON and so that the opposite conductive states also hold.

For example, when the impedance of an output when viewed from the rectenna 10 is larger than that of the load 30, first, the duty cycles of the switching element Q3 and Q4 are fixed to 1 and 0, respectively. Next, performing control for reducing the duty cycle of the switching element Q1 can reduce a current value from an input and increase the impedance when viewed from the input. The output voltage from the rectenna controller 20 can be controlled below the input voltage from the rectenna 10. The output current from the rectenna controller 20 can be controlled above the input current from the rectenna 10 (buck operations).

In contrast, when the impedance of the output when viewed from the rectenna 10 is smaller than that of the load 30, first, the duty cycles of the switching element Q1 and Q2 are fixed to 1 and 0, respectively. Next, performing control for increasing the duty cycle of the switching element Q3 from 0 can increase the current component that is fed back to the rectenna 10 through the switching element Q3 and reduce the impedance of the output when viewed from the rectenna 10. Thus, the output voltage from the rectenna controller 20 can be controlled above the input voltage from the rectenna 10. The output current from the rectenna controller 20 can be controlled below the input current from the rectenna 10 (boost operations).

The PWM controller 72 controls these buck and boost operations based on the input voltage Vin and the output voltage Vout measured by the input voltage measuring unit 74 and the output voltage measuring unit 76, respectively, so that the power conversion efficiency of the direct current power of the rectenna is maximized.

Next, operations of the rectenna controller 20 when the controller 70 does not operate and the advantages will be described. Here, a case where the controller 70 does not operate means a case where the controller 70 does not operate because a driving voltage is not supplied to the controller 70 thereby not outputting control signals to the switching elements Q1 to Q4. The case where the driving voltage is not supplied to the controller 70 is, for example, a case where the rectenna 10 does not receive microwaves or perform an operation for converting the microwaves into direct current power, or the rectenna 10 is faulty. Embodiment 1 describes an example case where a driving voltage is not supplied to the controller 70 because the rectenna 10 does not receive microwaves or perform an operation for converting the microwaves into direct current power.

Assume that a driving voltage is not supplied to the controller 70 because the rectenna 10 does not receive microwaves or perform an operation for converting the microwaves into direct current power. When the receiving antenna 12 of the rectenna 10 receives microwaves, the rectenna 10 converts the received microwaves into direct current power, thus resulting in an abrupt rise in the input voltage Vin from the rectenna 10.

Here, the controller 70 of the rectenna controller 20 is normally supplied with the driving voltage through the constant voltage regulator based on the input voltage Vin and operates. However, the controller 70 does not operate immediately after start of receiving the microwaves because the driving voltage is not supplied to the controller 70.

Since a controller does not operate in a conventional rectenna apparatus, the rectenna controller is in the OFF state, and a state between the rectenna and the load is open. Thus, the voltage to be applied to the rectenna abruptly rises and exceeds the breakdown voltage of the rectenna. This creates a problem in that the rectenna becomes faulty.

However, in the rectenna controller 20 according to Embodiment 1, the switching elements Q1 and Q3 disposed in the current path P1 connecting the input terminal 42 to the output terminal 52 are switching elements that become conducting when the controller 70 does not operate.

Thus, when the receiving antenna 12 of the rectenna 10 receives microwaves and the rectenna 10 supplies the abruptly rising direct current power to the rectenna controller 20, even in the case where the controller 70 does not operate, the switching elements Q1 and Q3 are conducting, and the abruptly rising direct current power is supplied to the load 30 through the switching element Q1, the inductor L1, and the switching element Q3 and is fed back as a ground voltage. Since this reduces the input voltage to be applied to the rectenna 10 and can prevent the input direct current power from abruptly rising, it is possible to prevent the rectifier 16 from yielding due to an abrupt rise in the voltage to be applied to the rectenna 10, and prevent a fault in the rectenna 10.

Since the driving voltage is supplied through the constant voltage regulator based on the input voltage Vin, the controller 70 starts to operate, and the rectenna controller 20 performs the aforementioned normal operations.

As described above, in the rectenna controller and the rectenna apparatus including the same according to Embodiment 1, when the controller does not operate, the switching elements are conducting to render the current path conductive. This can prevent an abrupt rise in the voltage to be applied to the rectenna, and prevent a fault in the rectenna.

Conventionally, a rectenna having a high breakdown voltage needs to be used in consideration of the abrupt rise in the voltage to be applied to the rectenna when the rectenna controller is in the OFF state. However, the rectenna controller according to Embodiment 1 including conducting switching elements when the controller does not operate can prevent the abrupt rise in the voltage to be applied to the rectenna. Since the rectenna lower in breakdown voltage and less expensive than conventional rectennas is available, the cost of the rectenna apparatus according to Embodiment 1 can be reduced.

For example, as illustrated in FIG. 3, the switching elements Q1 and Q3 can include pull-up resistors R1 and R2, respectively, each with a resistance of approximately several kΩ between the gate and the source, so that the switching elements Q1 and Q3 are stably conducting to render the current path P1 conductive when the controller 70 does not operate.

When the controller 70 of the rectenna controller 20 does not operate and the PWM controller 72 does not control the switching elements Q1 to Q4, the pull-up resistors R1 and R2 each with the resistance of approximately several kΩ maintain the gate-source voltage of each of the switching elements Q1 and Q3 nearly at 0 V, and can stably render the switching elements Q1 and Q3 conductive.

Here, when the rectenna 10 is simplified into a model whose internal resistor is connected in series with a voltage source in the rectenna apparatus 1 according to Embodiment 1, the voltage to be applied to the rectenna 10 is calculated by the following equation based on the relationship of the resistive voltage division: the voltage to be applied to the rectenna 10=an electromagnetic force of the rectenna 10×the resistance of the load 30/(the internal resistance of the rectenna 10+the resistance of the load 30). Furthermore, designing the voltage to be applied to the rectenna 10 without exceeding the breakdown voltage of the rectifier 16 of the rectenna 10 is desired. Assume that, for example, the electromagnetic force of the rectenna 10 is 20 V, the internal resistance of the rectenna 10 is 100Ω, and the breakdown voltage of the rectifier 16 is 15 V. When the resistance of the load 30 is less than 300Ω and the controller 70 does not start, the switching elements Q1 and Q3 are conducting. Even when the direct current power is supplied to the rectenna 10 as always, the voltage to be applied to the rectifier 16 does not exceed the breakdown voltage. Thus, appropriately designing the internal resistance of the rectenna 10 and the resistance of the load 30, and designing the voltage to be applied to the rectenna 10 without exceeding the breakdown voltage of the rectifier 16 of the rectenna 10 are desired.

Furthermore, when the load which is an output destination from the rectenna controller 20 is a load in which an output voltage is regarded as a constant voltage, such as a storage battery or an electric power system and the voltage drop across the switching elements Q1 and Q3 and the inductor L1 is sufficiently small, an output voltage output from the rectenna controller 20 is the constant voltage equal to the output voltage of the storage battery or the electric power system. Thus, when the output voltage of the storage battery or the electric power system is lower than the breakdown voltage of the rectifier 16 of the rectenna 10, the rectenna controller 20 according to Embodiment 1 is applicable.

Embodiment 1 describes an example case where a driving voltage is not supplied to the controller 70 because the rectenna 10 does not receive microwaves or perform an operation for converting the microwaves into direct current power. A configuration according to Embodiment 1 is not limited to this, but the rectenna controller 20 according to Embodiment 1 is applicable upon abrupt rise in a voltage to be applied to the input terminal 42 when the controller 70 does not operate. Specifically, for example, even when the controller 70 is faulty and inoperative, an abrupt rise in the voltage to be applied to the rectenna 10 and a fault in the rectenna 10 can be prevented.

Embodiment 1 also describes an example case where the switching elements Q1 and Q3 that are part of the voltage controller 60 are disposed in the current path P1 as the conducting switching elements when the controller 70 does not operate. A configuration according to Embodiment 1 is not necessarily limited to these. In addition to the switching elements Q1 and Q3, another switching element may also be disposed in the current path P1 as a conducting switching element when the controller 70 does not operate similarly to the switching elements Q1 and Q3.

Embodiment 2

A rectenna apparatus according to Embodiment 2 of the present invention includes a plurality of rectenna controllers that are connected in series with each other, unlike Embodiment 1. Since the other constituent elements with the same reference numerals are configured in the same manner as those in the rectenna controller according to Embodiment 1, the description will be omitted. Furthermore, since a rectenna according to Embodiment 2 is configured in the same manner as the rectenna according to Embodiment 1, the description will be omitted.

Figure 4:
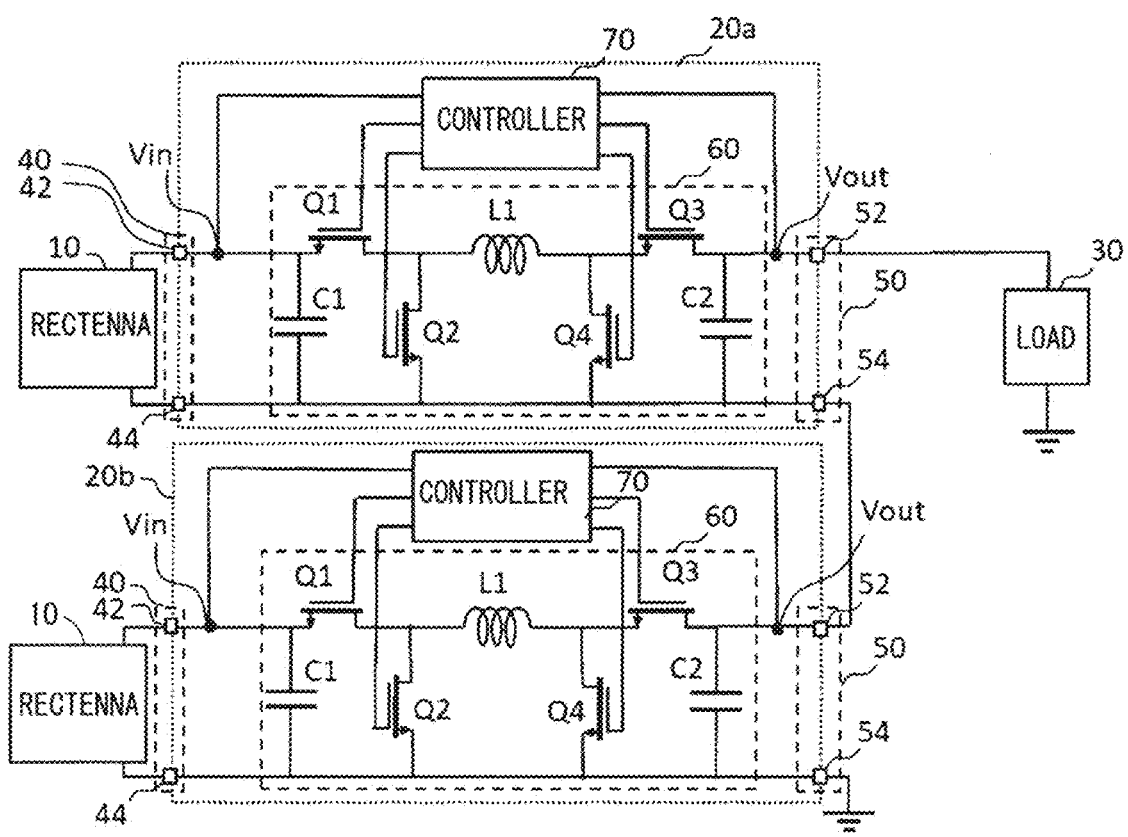
FIG. 4 is a circuit diagram illustrating a configuration of a rectenna apparatus according to Embodiment 2 of the present invention.

FIG. 4 is a circuit diagram illustrating a detailed configuration of the rectenna apparatus according to Embodiment 2.

As illustrated in FIG. 4, the rectenna apparatus according to Embodiment 2 includes a plurality of rectenna controllers 20a and 20b that are connected in series with each other. Specifically, an example case where the two rectenna controllers 20a and 20b are connected in series with each other will be described. The two rectenna controllers 20a and 20b are connected to different rectennas 10 through respective input units 40. The output terminal 52 of the rectenna controller 20a is connected to the load 30. The output ground terminal 54 of the rectenna controller 20a is connected to the output terminal 52 of the rectenna controller 20b. The output ground terminal 54 of the rectenna controller 20b is grounded. Since the circuit configuration of each of the rectenna controllers 20a and 20b is identical to that of the rectenna controller 20 according to Embodiment 1, the description will be omitted.

Although the two rectenna controllers are exemplified for the rectenna apparatus according to Embodiment 2, three or more rectenna controllers may be connected in series with each other.

Next, operations of the rectenna controllers 20a and 20b according to Embodiment 2 will be described.

Since the operations of the rectenna controllers 20a and 20b are identical to those according to Embodiment 1, the detailed description is omitted. The rectenna 10 connected to each of the rectenna controllers 20a and 20b receives microwaves and converts the microwaves into direct current power. Each of the rectenna controllers 20a and 20b controls the output voltage of the rectifier 16 by adjusting the impedance between the rectenna 10 and the load 30 so that the power conversion efficiency of the direct current power resulting from the conversion is maximized. For example, the direct current power with a voltage appropriate for the load 30 such as a storage battery, a power machine, or an electric power system is supplied.

Since operations of the rectenna controllers 20a and 20b when the controller 70 does not operate are identical to those according to Embodiment 1, the detailed description is omitted. For example, when the controller 70 of the rectenna controller 20a does not operate, upon input of the output voltage from the rectenna controller 20b through the rectenna 10 of the rectenna controller 20a or application of a voltage of the direct current power resulting from the conversion through reception of the microwaves by the rectenna 10 of the rectenna controller 20a, the input voltage Vin of the rectenna controller 20a abruptly rises.

Here, in the rectenna controller 20a according to Embodiment 2, the switching elements Q1 and Q3 disposed in the current path P1 connecting the input terminal 42 to the output terminal 52 are switching elements that become conducting when the controller 70 does not operate. Even when the controller 70 does not operate, the switching elements Q1 and Q3 are conducting, and the abruptly rising direct current power is supplied to the load 30 through the switching element Q1, the inductor L1, and the switching element Q3 of the rectenna controller 20a and is fed back as a ground voltage. Since this reduces the input voltage to be applied to the rectennas 10 of the rectenna controllers 20a and 20b and can prevent the input direct current power from abruptly rising, it is possible to prevent the rectifiers 16 from yielding due to an abrupt rise in a voltage to be applied to the rectennas 10, and prevent a fault in the rectennas 10.

For example, when the controller 70 of the rectenna controller 20b does not operate, the input voltage Vin of the rectenna controller 20b abruptly rises with application of the voltage of the direct current power resulting from the conversion after start of receiving the microwaves by the rectenna 10 of the rectenna controller 20b.

Here, in the rectenna controller 20b according to Embodiment 2, the switching elements Q1 and Q3 disposed in the current path P1 connecting the input terminal 42 to the output terminal 52 are switching elements that become conducting when the controller 70 does not operate. Even when the controller 70 does not operate, the switching elements Q1 and Q3 of the rectenna controller 20b are conducting, and the abruptly rising direct current power is supplied to the output ground terminal 54 of the rectenna controller 20a through the switching element Q1, the inductor L1, and the switching element Q3 of the rectenna controller 20b. The rectenna controller 20a that normally operates normally controls the impedance, and the output voltage of the rectenna controller 20b is supplied to the load 30. Since this reduces the input voltage to be applied to the rectenna 10 of the rectenna controller 20b and can prevent the input direct current power from abruptly rising, it is possible to prevent the rectifier 16 from yielding due to an abrupt rise in the voltage to be applied to the rectenna 10, and prevent a fault in the rectenna 10.

As described above, in the rectenna controllers and the rectenna apparatus including the same according to Embodiment 2, when the controller does not operate, the switching elements are conducting to render the current path conductive similarly to Embodiment 1. This can prevent an abrupt rise in the voltage to be applied to the rectenna, and prevent a fault in the rectenna.

Conventionally, a rectenna having a high breakdown voltage needs to be used in consideration of the abrupt rise in the voltage to be applied to the rectenna when the rectenna controller is in the OFF state. However, the rectenna controllers according to Embodiment 2 can prevent the abrupt rise in the voltage to be applied to the rectenna. Since the rectennas lower in breakdown voltage and less expensive than conventional rectennas are available, the cost of the rectenna apparatus according to Embodiment 2 can be reduced similarly to Embodiment 1.

Embodiment 3

In a rectenna apparatus according to Embodiment 3 of the present invention, a diode is connected to each of the input units of the rectenna controllers, unlike Embodiment 2. Since the other constituent elements with the same reference numerals are configured in the same manner as those in the rectenna controller according to Embodiment 1, the description will be omitted. Furthermore, since the rectenna apparatus according to Embodiment 3 is configured in the same manner as the rectenna apparatus according to Embodiment 1, the description will be omitted.

Figure 5:
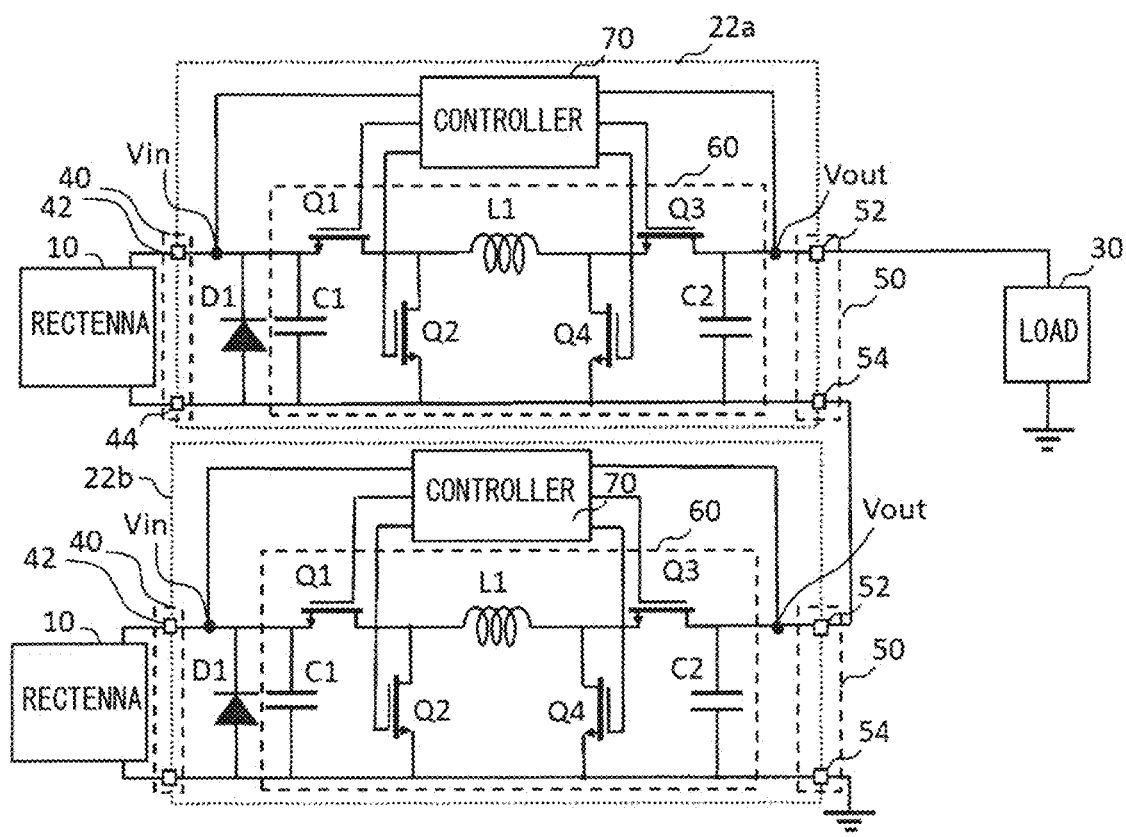
FIG. 5 is a circuit diagram illustrating a configuration of a rectenna apparatus according to Embodiment 3 of the present invention.

FIG. 5 is a circuit diagram illustrating a detailed configuration of the rectenna apparatus according to Embodiment 3.

As illustrated in FIG. 5, in each of rectenna controllers 22a and 22b according to Embodiment 3, a diode D1 is connected in parallel with the capacitor C1 between the input terminal 42 and the input ground terminal 44 of the input unit 40 and between the rectenna 10 and the voltage controller 60. The diode D1 has an anode connected to the input ground terminal 44 and a cathode connected to the input terminal 42. The diode D1 is, for example, a Zener diode, and is disposed in a forward direction between the input terminal 42 and the ground.

Next, operations of the rectenna controllers 22a and 22b according to Embodiment 3 will be described. Since the normal operations of the rectenna controllers 22a and 22b according to Embodiment 3 are identical to those according to Embodiments 1 and 2, the description will be omitted. The description of the operations of the rectenna controllers 22a and 22b when the controller 70 does not operate will be omitted if the operations are identical to those according to Embodiment 2. The operations different from those according to Embodiment 2 will be described.

For example, when the rectenna 10 connected to the rectenna controller 22a is faulty and the output unit of the rectenna is open, the direct current power applied to the input terminal 42 of the rectenna controller 20a in the configuration of the rectenna controllers 20a and 20b according to Embodiment 2 is supplied to the load 30 through the switching element Q1, the inductor L1, and the switching element Q3 and is fed back as a ground voltage. However, the direct current power supplied from the rectenna controller 20b cannot be supplied to the load 30 through the switching element Q1, the inductor L1, and the switching element Q3 of the rectenna controller 20a, and be fed back as a ground voltage because the rectenna 10 connected to the rectenna controller 20a is faulty and thus the rectenna 10 of the rectenna controller 20a is open. Thus, the voltage to be applied to the rectenna 10 of the rectenna controller 20b abruptly rises, and the rectenna 10 of the rectenna controller 20b becomes faulty.

However, in each of the rectenna controllers 22a and 22b according to Embodiment 3, the diode D1 is connected in parallel with the capacitor C1 between the input terminal 42 and the input ground terminal 44 of the input unit 40 and between the rectenna 10 and the voltage controller 60. Thus, the output voltage supplied from the rectenna controller 22b is applied to the anode of the diode D1 of the rectenna controller 22a, so that a forward current flows through the diode D1. This can prevent an abrupt rise in the voltage to be applied to the rectenna 10 connected to the rectenna controller 22b, and prevent a fault in the rectenna 10 connected to the rectenna controller 22b.

Since the direct current power generated by the rectenna 10 connected to the rectenna controller 22b can be supplied to the load 30 through the diode D1 of the rectenna controller 22a, the direct current power generated by the rectenna 10 that is not faulty can be effectively used.

As described above, the rectenna controllers and the rectenna apparatus including the same according to Embodiment 3 can prevent an abrupt rise in the voltage to be applied to the rectenna, and prevent a fault in the rectenna similarly to Embodiments 1 and 2. Since the rectennas lower in breakdown voltage and less expensive than conventional rectennas are available similarly to Embodiments 1 and 2, the cost of the rectenna apparatus according to Embodiment 3 can be reduced.

Since the rectenna controllers and the rectenna apparatus including the same according to Embodiment 3 include the diodes, even when the rectenna connected to one of the rectenna controllers that are connected in series with each other is faulty, it is possible to prevent an abrupt rise in the voltage to be applied to the rectenna connected to the rectenna controller that is not faulty, and prevent a fault in the rectenna connected to the rectenna controller that is not faulty. Since the direct current power generated by the rectenna that is not faulty can be supplied to the load, the direct current power can be effectively used.

Furthermore, the use of Zener diodes as the diodes D1 disposed in the rectenna controllers according to Embodiment 3 can constantly maintain the voltage to be applied to the rectennas 10. Since the Zener diodes yield before the rectennas 10 yield by making the breakdown voltage of the Zener diodes lower than that of the rectennas 10, it is possible to further prevent a fault in the rectennas 10.

Here, connection of the diode D1 in parallel with the capacitor C1 between the input terminal 42 and the input ground terminal 44 of the input unit 40 and between the rectenna 10 and the voltage controller 60 in each of the rectenna controllers 22a and 22b according to Embodiment 3 is described above as an example. For example, switching elements Q5 may be provided as a replacement for the diodes D1 as illustrated in FIG. 6.

In such a case, the switching elements Q5 have respective control terminals connected to the controllers 70, and are switching elements that become conducting when the controllers 70 do not operate, similarly to the switching elements Q1 and Q3. Specific examples of the switching elements Q5 are identical to those of the switching elements Q1 and Q3 according to Embodiment 1.

Even when one of the rectennas 10 is faulty and open, the use of the conducting switching elements Q5 when the controllers 70 do not operate similarly to the diodes D1 can prevent an abrupt rise in the voltage to be applied to the rectenna 10 connected to the rectenna controller 20 that is not faulty, using the current path of the conducting switching element Q5, and prevent a fault in the rectenna 10 connected to the rectenna controller 20 that is not faulty. Since the direct current power generated by the rectenna 10 that is not faulty can be supplied to the load, the direct current power can be effectively used.

Although an example of disposing the diodes D1 or the switching elements Q5 in the rectenna controllers 20 is described, they are not necessarily disposed in the rectenna controllers 20 but may be separately disposed in the rectennas 10 or between the rectennas 10 and the rectenna controllers 20.

Embodiment 4

In rectenna controllers according to Embodiment 4 of the present invention, each controller renders conductive a switching element connected in parallel with a diode when a current flows through the diode unlike Embodiment 3. Since the other constituent elements with the same reference numerals are configured in the same manner as those in the rectenna controllers according to the other Embodiments, the description will be omitted. Furthermore, since a rectenna apparatus according to Embodiment 4 is configured in the same manner as the rectenna apparatus according to Embodiment 1, the description will be omitted.

Since a circuit configuration, normal operations, and operations when the controllers 70 do not operate in the rectenna apparatus according to Embodiment 4 are identical to those according to Embodiment 3, the description will be omitted, and only differences from Embodiment 3 will be described.

As illustrated in FIG. 5, when a current flows through the diodes D1, each of the controllers 70 controls, into a conductive state, at least one of the switching elements Q2 and Q4 connected in parallel with the diode D1 in the rectenna apparatus according to Embodiment 4.

Specifically, for example, when the rectenna 10 connected to the rectenna controller 22a is faulty similarly to Embodiment 3, the output voltage supplied from the rectenna controller 22b is applied to the anode of the diode D1 of the rectenna controller 22a, so that the forward current flows through the diode D1.

Since the controller 70 of the rectenna controller 22a does not operate and the switching elements Q1 and Q3 of the rectenna controller 22a are conducting, the output voltage supplied from the rectenna controller 22b is supplied to the load 30 through the diode D1, the switching element Q1, the inductor L1, and the switching element Q3 of the rectenna controller 22a, and is fed back as a ground voltage. This procedure is the same as that according to Embodiment 3.

Then, after the controller 70 of the rectenna controller 22a starts to operate, for example, based on the output voltage supplied from the rectenna controller 22b, the controller 70 of the rectenna controller 22a controls at least one of the switching elements Q2 and Q4 into a conductive state.

Similarly to Embodiment 3, the flow of the forward current through the diode D1 can prevent an abrupt rise in the voltage to be applied to the rectenna 10 connected to the rectenna controller 22b. Furthermore, controlling, into a conductive state, at least one of the switching elements Q2 and Q4 with a voltage drop lower than that of the diode D1 can reduce the power loss of the direct current power supplied to the load 30, and supply the direct current power generated by the rectenna 10 that is not faulty to the load 30 with a high degree of efficiency.

Furthermore, since controlling, into a conductive state, at least one of the switching elements Q2 and Q4 can reduce the forward current flowing through the diodes D1, the heat generated in the diodes D1 and the deterioration of the diodes D1 can be suppressed. Moreover, increase in the temperature of peripheral components such as an electrolytic capacitor due to increase in the temperature of the diodes D1, and reduced performance and the deterioration of the peripheral components can be suppressed.

Here, when the rectenna 10 connected to the rectenna controller 22a is faulty, the rectenna controller 22a cannot obtain the direct current power from the rectenna 10, and the controller 70 is inoperative. Although the output voltage supplied from the rectenna controller 22b causes the forward current to flow through the diode D1, the output voltage is a reverse voltage with respect to the input voltage supplied from the rectenna 10 connected to the rectenna controller 22a. Thus, the normal constant voltage regulator described in Embodiment 1 cannot operate the controller 70. According to Embodiment 4, for example, a switching regulator may be provided to supply power to the controller 70 of the rectenna controller 22a connected to the rectenna 10 that is faulty so that the controller 70 of the rectenna controller 22a starts to operate and at least one of the switching elements Q2 and Q4 can be controlled into a conductive state. The switching regulator inverts, into a forward voltage, the output voltage supplied from the rectenna controller 22b through the diode D1 as the reverse voltage to boost the forward voltage. Moreover, an auxiliary direct current voltage source such as a secondary battery or a capacitor may be separately provided. Upon detecting a flow of the forward current through the diode D1, the auxiliary direct current voltage source may supply power to the controller 70.

The rectenna controllers according to Embodiment 4 are applicable when a high voltage is applied to one of the rectennas 10 upon receipt of microwaves, and the diode D1 yields. Specifically, when the rectenna apparatus does not operate, assume that the rectenna 10 connected to the rectenna controller 22a receives microwaves, and the abruptly rising direct current power is applied to the rectenna 10. If the breakdown voltage of the diode D1 is lower than that of the rectenna 10, the diode D1 yields, the reverse current flows through the diode D1, and a fault in the rectenna 10 is prevented. This procedure is the same as that according to Embodiment 3.

Then, the controller 70 starts to operate with the direct current power from the rectenna 10 connected to the rectenna controller 22a, and controls at least one of the switching elements Q2 and Q4 into a conductive state.

This prevents a fault in the rectenna 10 because the diode D1 yields similarly to Embodiment 3. Moreover, since a part of the reverse current flowing through the diode D1 flows through at least one of the switching elements Q2 and Q4 that has been controlled into a conductive state, the reverse current flowing through the diode D1 can be reduced. This can suppress the heat generated in the diode D1 and the deterioration of the diode D1. Moreover, increase in the temperature of the peripheral components such as an electrolytic capacitor due to increase in the temperature of the diode D1, and the reduced performance of the peripheral components can be suppressed.

As described above, the rectenna controllers and the rectenna apparatus including the same according to Embodiment 4 can prevent an abrupt rise in the voltage to be applied to the rectennas, and prevent a fault in the rectennas similarly to the other Embodiments. Since the rectennas lower in breakdown voltage and less expensive than conventional rectennas are available similarly to Embodiments 1 and 2, the cost of the rectenna apparatus according to Embodiment 4 can be reduced.

Similarly to Embodiment 3, even when the rectenna connected to one of the rectenna controllers that are connected in series with each other is faulty, provision of the diodes can prevent an abrupt rise in the voltage to be applied to the rectenna of the rectenna controller that is not faulty, and prevent a fault in the rectenna. Since the direct current power generated by the rectenna that is not faulty can be supplied to the load, the direct current power can be effectively used.

Similarly to Embodiment 3, the use of Zener diodes can constantly maintain the voltage to be applied to the rectennas. Since the Zener diodes yield before the rectennas yield by making the breakdown voltage of the Zener diodes lower than that of the rectennas, it is possible to further prevent a fault in the rectennas.

When a current flows through the diodes in the rectenna controllers and the rectenna apparatus including the same according to Embodiment 4, each controller renders the switching element connected in parallel with the diode conductive, so that the power loss of the direct current power supplied to the load can be reduced, and the direct current power generated by the rectenna that is not faulty can be supplied to the load 30 with a high degree of efficiency. Moreover, the heat generated in the diodes and the deterioration of the diodes can be suppressed. Increase in the temperature of the peripheral components such as an electrolytic capacitor due to increase in the temperature of the diodes, and the reduced performance and the deterioration of the peripheral components can be suppressed.

Although Embodiment 4 exemplifies the diodes D1, Embodiment 4 is applicable to the switching elements Q5 as a replacement for the diodes D1, similarly to the configuration of FIG. 6 described in Embodiment 3. In such a case, the configuration and the operations of the switching elements Q2 and Q4 are identical to those described above.

Embodiments can be freely combined, and appropriately modified or omitted within the scope of the present invention. Furthermore, the present invention is not limited to Embodiments above, but can be variously modified without departing from the spirit and scope of the present invention when Embodiments are put into effect. Embodiments above include various modifications which can be conceived by appropriate combinations of a plurality of the disclosed constituent elements.

EXPLANATION OF REFERENCE SIGNS 10 rectenna, 20, 20a, 20b, 22a, 22b rectenna controller, 30 load, 40 input unit, 50 output unit, 60 voltage controller, 70 controller, Q1 to Q5 switching element, D1 diode

The invention claimed is:

1. A rectenna controller connected to a rectenna that receives radio frequency power and converts the radio frequency power into direct current power, the rectenna controller controlling the direct current power received from the rectenna and supplying the controlled direct current power to a load, the rectenna controller comprising:
an input terminal receiving the direct current power converted by the rectenna;
an output terminal supplying the controlled direct current power to the load;
a first switching element disposed in a current path connecting the input terminal to the output terminal; and
a controller controlling the first switching element,
wherein when the controller does not operate, the first switching element becomes conducting to render the current path conductive.

2. The rectenna controller according to claim 1, wherein the first switching element is a normally-on transistor.

3. The rectenna controller according to claim 2, wherein the normally-on transistor includes a gate electrode connected to the controller, and a source electrode connected to the input terminal,
the rectenna controller comprising a pull-up resistor connected between the gate electrode and the source electrode.

4. The rectenna controller according to claim 1, comprising
a diode having a cathode connected to the input terminal, and an anode that is grounded.

5. The rectenna controller according to claim 4, comprising
a second switching element connected in parallel with the diode and controlled by the controller,
wherein the controller renders the second switching element conductive when a current flows through the diode.

6. The rectenna controller according to claim 4, wherein the diode is a Zener diode.

7. The rectenna controller according to claim 1, comprising
a third switching element connected between the input terminal and the ground, the third switching element becoming conducting when the controller does not operate.

8. The rectenna controller according to claim 7, comprising
a fourth switching element connected in parallel with the third switching element and controlled by the controller,
wherein the controller renders the fourth switching element conductive when a current flows through the third switching element.

9. A rectenna apparatus, comprising:
a rectenna receiving radio frequency power and converting the radio frequency power into direct current power; and
at least one rectenna controller connected to the rectenna,
each of the at least one rectenna controller configured to receive radio frequency power and convert the radio frequency power into direct current power, the rectenna controller controlling the direct current power received from the rectenna and supplying the controlled direct current power to a load, each of the at least one rectenna controller including
an input terminal receiving the direct current power converted by the rectenna;
an output terminal supplying the controlled direct current power to the load;
a first switching element disposed in a current path connecting the input terminal to the output terminal; and
a controller controlling the first switching element,
wherein when the controller does not operate, the first switching element becomes conducting to render the current path conductive, and
wherein the at least one rectenna controller includes a plurality of rectenna controllers connected in series with each other.

* * * * *